US006846234B1

United States Patent
Hergott et al.

(10) Patent No.: US 6,846,234 B1
(45) Date of Patent: Jan. 25, 2005

(54) METHOD AND MEANS FOR ADVANCING A SAUSAGE CASING USING FLUID POWER

(75) Inventors: Steven P. Hergott, Ankeny, IA (US); David S. Hamblin, Norwalk, IA (US); Michael J. Hardy, West Des Moines, IA (US)

(73) Assignee: Townsend Engineering Company, Des Moines, IA (US)

( * ) Notice: Subject to any disclaimer, the term of this patent is extended or adjusted under 35 U.S.C. 154(b) by 0 days.

(21) Appl. No.: 10/657,993

(22) Filed: Sep. 9, 2003

(51) Int. Cl.[7] .............................................. A22C 11/00
(52) U.S. Cl. ........................................................ 452/32
(58) Field of Search ............................. 452/30–35, 37

(56) References Cited

U.S. PATENT DOCUMENTS

| | | | |
|---|---|---|---|
| 990,547 A | | 4/1911 | Gunuskey |
| 1,395,967 A | | 11/1921 | Merli et al. |
| 2,568,491 A | | 9/1951 | Edwards |
| 3,150,410 A | | 9/1964 | Washburn |
| 3,195,176 A | | 7/1965 | Washburn |
| 3,253,297 A | | 5/1966 | Nuckles |
| 3,404,430 A | | 10/1968 | Kielsmeier et al. |
| 3,480,449 A | | 11/1969 | Sumption |
| 3,672,001 A | | 6/1972 | Greider |
| 3,805,329 A | | 4/1974 | Kollross |
| 3,805,480 A | | 4/1974 | Cherio et al. |
| 3,826,852 A | | 7/1974 | Levaco et al. |
| 3,892,009 A | * | 7/1975 | Townsend .................... 452/45 |
| 3,952,370 A | | 4/1976 | Greider |
| 3,964,236 A | | 6/1976 | Smith |
| 3,988,804 A | * | 11/1976 | Regner et al. ................ 452/25 |
| 4,112,546 A | | 9/1978 | Muller |
| 4,185,358 A | * | 1/1980 | Regner et al. ................ 452/25 |
| 4,202,075 A | | 5/1980 | Michel et al. |
| RE30,390 E | | 9/1980 | Kupcikevicius et al. |
| 4,257,146 A | | 3/1981 | Karp |
| 4,307,489 A | * | 12/1981 | Niedecker .................... 452/32 |
| 4,363,819 A | * | 12/1982 | Steffen ....................... 426/132 |
| 4,370,780 A | * | 2/1983 | Kollross ...................... 452/25 |
| 4,434,527 A | | 3/1984 | Staudenrausch et al. |
| 4,437,209 A | | 3/1984 | Duroyon |
| 4,438,545 A | | 3/1984 | Kupcikevicius et al. |
| 4,479,283 A | * | 10/1984 | Hollingsworth .............. 452/22 |
| 4,489,460 A | | 12/1984 | Nausedas |
| 4,525,895 A | | 7/1985 | Raudys |
| 4,580,316 A | | 4/1986 | Gunter |
| 4,593,433 A | | 6/1986 | Nausedas |

(List continued on next page.)

FOREIGN PATENT DOCUMENTS

| | | |
|---|---|---|
| DE | 1136604 | 9/1962 |
| DE | 4232759 | 3/1994 |
| DE | 29819328 U1 | 10/1998 |
| DE | 10001423 A1 | 1/2000 |
| EP | 0379123 | 7/1990 |
| FR | 2780246 | 12/1999 |

*Primary Examiner*—Thomas Price

(57) ABSTRACT

A stuffing tube for a meat encasing machine that has a hollow stuffing tube. The hollow stuffing tube also has an inner chamber that is fluidly linked to the exterior of the hollow tube by a series of openings located in the wall of the stuffing tube. The openings and chamber allow water connected to a water source to be pumped into the stuffing tube. This causes a lubricating water surface to accumulate on the exterior of the stuffing tube providing lubrication for a sausage casing. This lubrication facilitates the sliding movement of the casing longitudinally along the stuffing tube.

9 Claims, 3 Drawing Sheets

U.S. PATENT DOCUMENTS

| | | | | |
|---|---|---|---|---|
| 4,624,030 A | * | 11/1986 | Dreisin | 452/35 |
| 4,642,848 A | | 2/1987 | Kollross | |
| 4,649,602 A | | 3/1987 | Kupcikevicius | |
| 4,660,254 A | * | 4/1987 | Kollross | 452/22 |
| 4,683,617 A | | 8/1987 | Raudys | |
| 4,768,261 A | | 9/1988 | Nakamura | |
| 4,893,377 A | | 1/1990 | Evans et al. | |
| 4,905,587 A | * | 3/1990 | Smithers | 99/534 |
| 4,970,758 A | | 11/1990 | Naples et al. | |
| 4,991,260 A | | 2/1991 | Nausedas | |
| 5,046,219 A | | 9/1991 | Stanley | |
| 5,092,814 A | | 3/1992 | Kasai et al. | |
| 5,147,239 A | | 9/1992 | Staudenrausch | |
| 5,273,482 A | | 12/1993 | Beckman et al. | |
| 5,297,983 A | | 3/1994 | Mueller et al. | |
| 5,352,151 A | | 10/1994 | Piereder | |
| 5,354,228 A | | 10/1994 | Smith et al. | |
| 5,399,213 A | | 3/1995 | Oxley | |
| 5,743,792 A | | 4/1998 | Hanten et al. | |
| 5,813,906 A | | 9/1998 | Phillips | |
| 5,830,050 A | | 11/1998 | Nakamura et al. | |
| 5,842,914 A | | 12/1998 | Vermeer et al. | |
| 6,042,466 A | * | 3/2000 | Matthews et al. | 452/45 |
| 6,050,888 A | | 4/2000 | Nakamura et al. | |
| 6,056,635 A | | 5/2000 | Vermeer et al. | |
| 6,066,035 A | | 5/2000 | Hergott et al. | |
| 6,066,036 A | | 5/2000 | Carollo | |
| 6,139,416 A | | 10/2000 | Toepfer | |
| 6,326,039 B1 | * | 12/2001 | Schiffmann et al. | 426/238 |
| 6,524,177 B2 | | 2/2003 | Bolzacchini | |
| 6,572,464 B1 | | 6/2003 | Hergott et al. | |
| 6,585,580 B1 | | 7/2003 | Hergott et al. | |
| 6,659,853 B1 | | 12/2003 | Hergott et al. | |
| 6,659,854 B1 | | 12/2003 | Hergott et al. | |
| 6,733,812 B2 | * | 5/2004 | Franklin et al. | 426/513 |

* cited by examiner

METHOD AND MEANS FOR ADVANCING A SAUSAGE CASING USING FLUID POWER

BACKGROUND OF THE INVENTION

Sausages have been traditionally made by filling the natural intestines of sheep or other animals, with a sausage product whereupon the filled natural casing was formed into links for cooking. In more modern times, sausages are predominantly made by introducing an emulsion into an artificial casing, which encases the sausage material through linking and preliminary cooking. Machines for making sausages with artificial casings have a high volume capability (up to 30,000 sausages per hour). Efforts have been made to use these high-speed machines with natural casings. However, because of the nature of the natural casings including their relatively shorter and variable length and non-uniform diameter, modern sausage encasing machines have not achieved the volume and capacity with natural casings as they do with artificial casings.

It is therefore a principal object of the invention to provide a method of advancing a sausage casing that improves upon the state of the art.

A further object of this invention is to use water in the stuffing tube in order to facilitate the movement of the sausage casing.

A still further object of this invention is to use pressurized fluids in the advancement of a casing along a stuffing tube.

These and other objects will be apparent to those

BRIEF SUMMARY OF THE INVENTION

A stuffing tube for a meat encasing machine that has an elongated hollow tube that is adapted to receive meat emulsion and discharge the emulsion. The tube is cylindrical and has a plurality of spaced openings that create passageways from the hollow interior of the tube to the outside of the tube. A fluid source is then connected to the interior of the tube and water passes through its interior and through the openings to lubricate the outside of the hollow tube to facilitate the sliding movement of a tubular casing.

DESCRIPTION OF THE EMBODIMENTS OF THE INVENTION

The term "emulsion" as used herein includes meat or any other edible substance.

Figure 1:
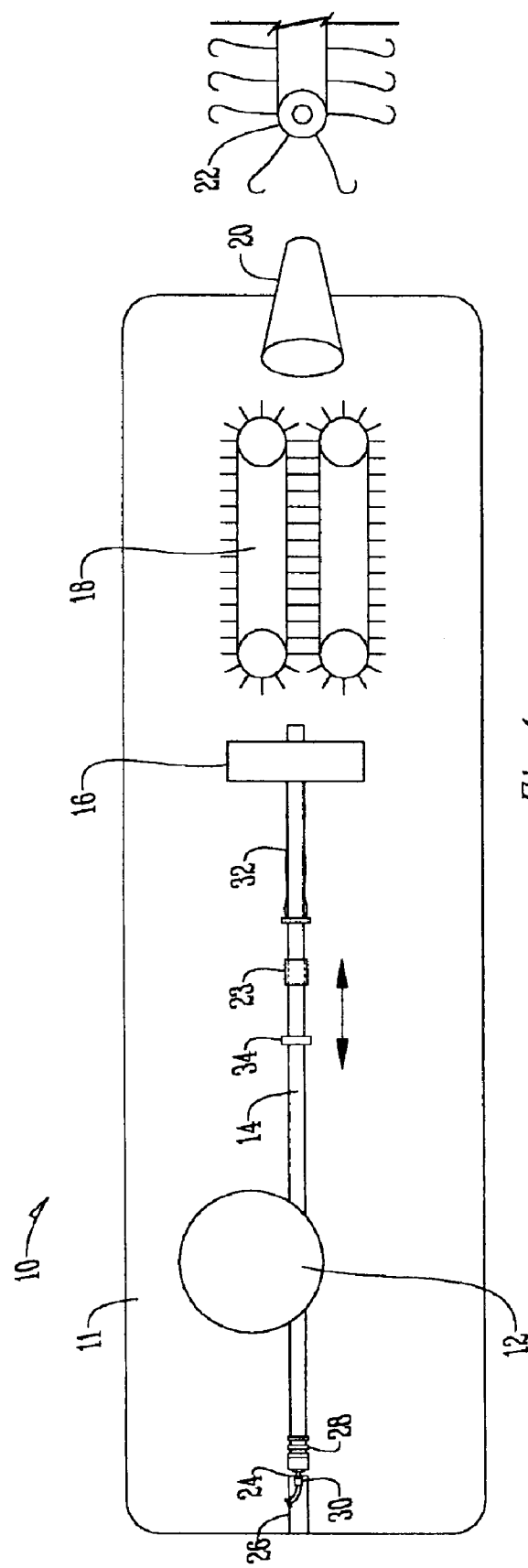
FIG. 1 is a plan view of a sausage making machine showing the conventional components.
Figure 2:
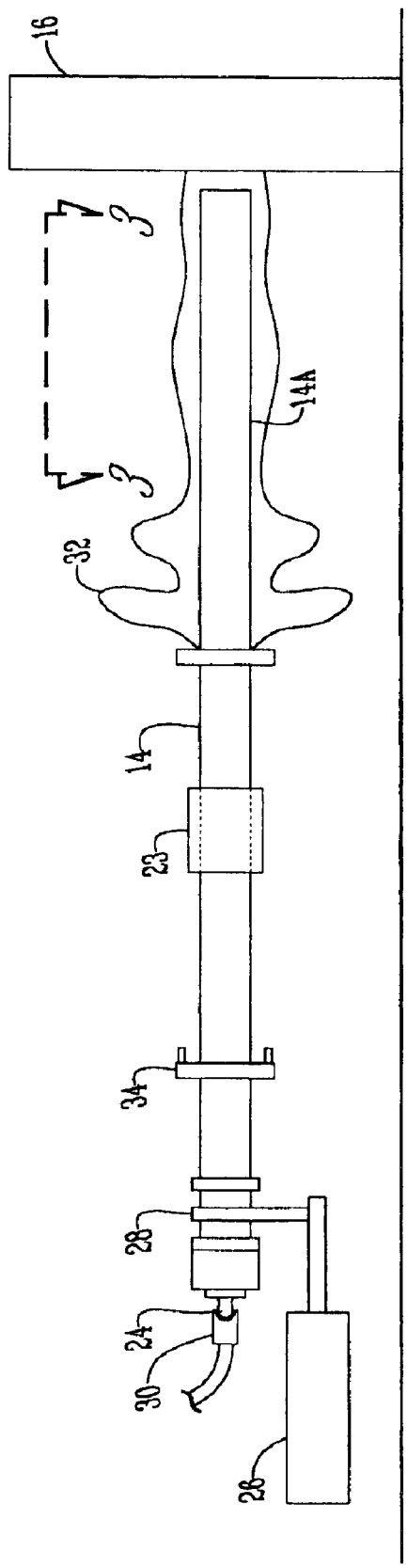
FIG. 2 is a plan view of a sausage making machine showing conventional components as modified by this invention.

With reference to FIG. 1, a conventional sausage making machine 10 has a frame 11, a pump 12 connected to a source of emulsion (not shown), and a slidable stuffing tube 14 that has a discharge end 14A (FIG. 2). The sausage making machine 10 further has a twisting mechanism 16, a linking mechanism 18, a discharge horn 20, and a conveyor 22.

Figure 3:
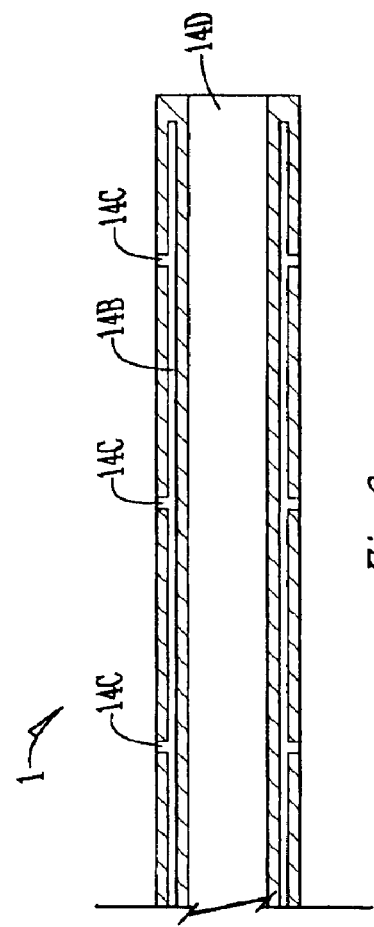
FIG. 3 is a sectional view of the interior of the hollow stuffing tube viewed in direction line 3—3 of FIG. 2.

FIG. 2 shows part of a sausage making machine 10 that additionally has a stuffing block 23, a fitting 24, a cylinder 26 attached to the tube with a yoke 28, and a water source 30. FIG. 3 shows a detailed sectional view of the stuffing tube 14. The stuffing tube has a hollow inner diameter 14D disposed through its center and an opened circular chamber 14B within the stuffing tube 14. The chamber 14B is fluidly connected to the outside of the stuffing tube 14 via a series of holes 14C. This chamber 14B and the holes 14C allow water to be pumped into the hollow tube 14 and onto the exterior surface of the hollow tube 14. The hollow interior 14D can also be seen in FIG. 2. In a preferred embodiment, the holes 14C decrease in size as they near the end of the stuffing tube 14.

In operation when a sausage casing 32 is on the outer surface of the stuffing tube 14, water is pumped into the chamber 14B via a water source 30 connected to a fitting 24 located at the opposite end of the exit end of the stuffing tube 14. The extension and retraction of the stuffing tube 14 is accomplished by a cylinder 26 attached to the tube with a yoke 28. The tube is rotated using a standard linking machining rotator and the rotator bracket 34 on the stuffing tube 14. Meat emulsion is pumped into the inner diameter of the tube 14D via a stuffing block 23 attached to a metering pump. Casing 32 is slid over the exterior of tube 14 and fed into the twisting mechanism 16. The flow of water through the holes 14C assists the casing to easily slide off the tube 14 and through the twisting mechanism 16 as the twisting mechanism 16 and linker draw the casing 32 off the tube.

Figure 4:
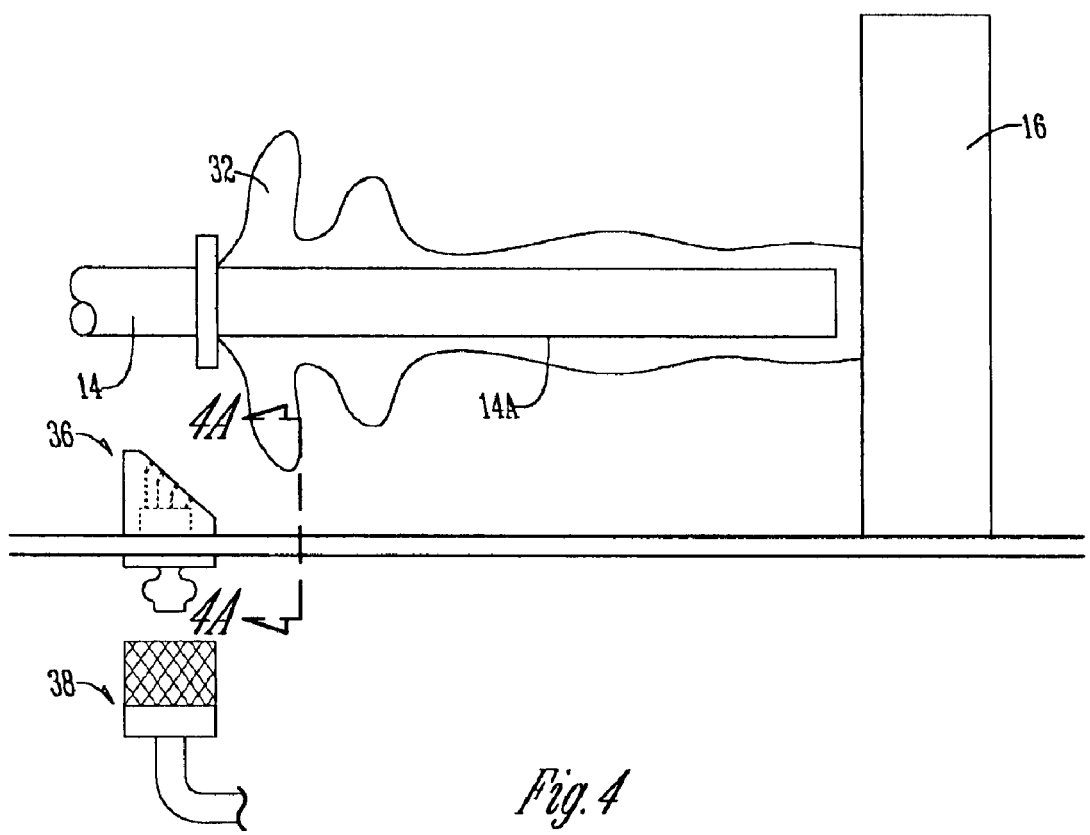
FIG. 4 is a plan view of nozzle manifold used to assist the moving of the sausage casing.
Figure 4A:
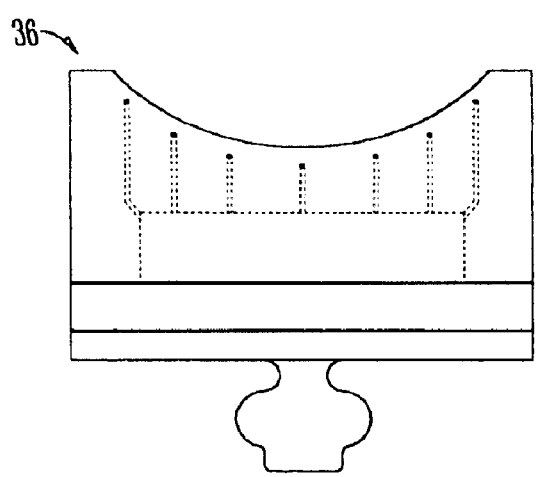
FIG. 4A is a front view of the manifold of FIG. 4 looked at with respect to lines 4A in FIG. 4.

FIG. 4 shows another embodiment of the present invention. As shown, a stuffing tube 14 still has a casing 32 on its outer surface. Located exterior of the stuffing tube 14 is a nozzle manifold 36 that is connected to a fluid source 38. In operation, the stuffing tube 14 with casing 32 feeds the twisting mechanism 16. Like the hollow stuffing tube 14, the manifold 36 has several openings spaced apart from one another as can be best seen in FIG. 4A. The casing 32 is assisted in its motion off the end of tube 14 and into the twisting mechanism 16 by jets of water from the openings of nozzle manifold 36. The manifold 36 is fluidly connected to a fluid source 38 so that jets of fluid may be projected against the casing 32 and facilitates the pushing of the casing 32 longitudinally away from the nozzle manifold 36. The jets of fluid may be in a steady stream or in a controlled pulse. It should be appreciated that any type of fluid, including water or air may be used by the nozzle manifold 36.

Therefore, a sausage encasing machine that uses fluid sources to facilitate the movement of the sausage casings has been disclosed. It will be appreciated by those skilled in the art that other various modifications could be made to the device without the parting from the spirit in scope of this invention. All such modifications and changes fall within the scope of the claims and are intended to be covered thereby.

What is claimed is:

1. A stuffing tube for a meat encasing machine, comprising:

an elongated hollow tube having an outer surface and a center bore with a discharge end adapted to receive meat emulsion in the bore for discharge through the discharge end;

the bore being surrounded by a cylindrical wall, an annular open chamber in the cylindrical wall, a plurality of spaced openings extending between the annular open chamber and the outer surface of the hollow tube and being adapted for connection to a source of fluid so that fluid could pass from the cylindrical open chamber to the outer surface of the hollow tube to serve as a lubricant to facilitate the sliding movement of a tubular casing on the outer surface during a sausage encasing operation and wherein the spaced openings decrease in size as they near the discharge end.

2. A method of advancing a natural casing along the length of hollow meat stuffing tube, comprising:

placing a hollow natural casing on the outside surface of a hollow stuffing tube having a meat emulsion discharge end, placing a follower against a upstream end of the natural casing to slide the natural casing forwardly along the stuffing tube towards a discharge end, and projecting jets of water towards and against a downstream portion of the casing to slidably propel the casing longitudinally in a downstream direction towards the discharge end.

3. A system for advancing a natural casing along the length of a hollow meat stuffing tube having a discharge end comprising:

a casing slidably engaging the hollow meat stuffing tube;

a nozzle manifold having spaced openings adapted to project fluid against the casing so as to cause the casing to slidably propel longitudinally in an downstream direction toward the discharge end of the stuffing tube; and a fluid source fluidly connected to the nozzle manifold.

4. The system of claim 3 wherein the fluid projected is water.

5. The system of claim 3 wherein the fluid projected is air.

6. A system for advancing a natural casing along the length of hollow meat stuffing tube, comprising:

means for placing a hollow natural casing on the outside surface of a hollow stuffing tube having a meat emulsion discharge end, means for placing a follower against a upstream end of the natural casing to slide the natural casing forwardly along the stuffing tube towards a discharge end, and means for projecting jets of water towards and against a downstream portion of the casing to slidably propel the casing longitudinally in a downstream direction towards the discharge end.

7. The system of claim 6, wherein the means for projecting jets of water comprises; a nozzle manifold having spaced openings adapted to project fluid against the casing so as to cause the casing to slidably propel longitudinally in a downstream direction toward the discharge end of the stuffing tube; and a fluid source fluidly connected to the nozzle manifold.

8. The system of claim 7 wherein the fluid projected is water.

9. The system of claim 7 wherein the fluid projected is air.

* * * * *